United States Patent [19]

Joubert et al.

[11] 4,238,927
[45] Dec. 16, 1980

[54] ROTARY EXCHANGER FOR GAS TURBINE INSTALLATIONS

[75] Inventors: Raymond J. M. Joubert, Savigny sur Orge; Jean G. Bouiller, Brunoy, both of France

[73] Assignee: Societe' Nationale d'Etude et de Construction de Moteurs d'Aviation, Paris, France

[21] Appl. No.: 965,342

[22] Filed: Dec. 1, 1978

[30] Foreign Application Priority Data

Dec. 5, 1977 [FR] France ................. 77 37108

[51] Int. Cl.³ ............................................. F02C 7/105
[52] U.S. Cl. .................................. 60/39.51 H; 165/9
[58] Field of Search .................. 60/39.51 H, 39.51 R; 165/8, 9

[56] References Cited

U.S. PATENT DOCUMENTS

| | | | |
|---|---|---|---|
| 3,145,534 | 8/1964 | Williams et al. | 60/39.51 H |
| 3,162,241 | 12/1964 | Smith | 165/9 |
| 3,177,928 | 4/1965 | Tumavious et al. | 165/7 |
| 3,294,156 | 12/1966 | Beaufrere et al. | 165/9 |
| 3,389,746 | 6/1968 | Straniti et al. | 165/9 |

FOREIGN PATENT DOCUMENTS

| | | | |
|---|---|---|---|
| 1221850 | 7/1966 | Fed. Rep. of Germany | 60/39.51 H |
| 1517690 | 4/1902 | France . | |
| 1147837 | 11/1957 | France . | |
| 683282 | 11/1952 | United Kingdom . | |

Primary Examiner—Louis J. Casaregola
Attorney, Agent, or Firm—Bacon & Thomas

[57] ABSTRACT

An exchanger has at least one heat exchange matrix, forming a cylindrical ring. In other embodiments, the exchanger is formed of at least two cylindrical rings, which are coaxial with the axis of the turbine. The flows of compressed cold air and of hot exhaust gas are directed into complementary sectors of the rings. The axial sealing devices are rollers, which are parallel to the axis of the matrices and are borned by their surface on the surface of the matrices in order to form the joint. The fluid distribution housing forms a counter current heat exchanger.

14 Claims, 12 Drawing Figures

ROTARY EXCHANGER FOR GAS TURBINE INSTALLATIONS

BACKGROUND OF THE INVENTION

This invention is in the field of rotary exchangers for gas turbine installations, in particular a modular exchanger entity and its sealing devices.

For a long time, means have been sought for the reduction of fuel consumption in gas turbine installations by recovering heat from the exhaust gases. Numerous types of exchangers have been tested and used. A stationary installation does not raise problems, which are too complicated and does not require the use of exchangers with light weight and small dimensions, it is not the same for mobile installations, in particular aircraft turbines.

French Pat. No. 1,496,850 provides a solution for the use of exchangers for the recovery of heat from the combustion gases in an aircraft turbine. In these exchangers, the hot combustion gases and the compressed cold air coming from the compressor are simultaneously passed through the same heat exchanger paths. Inside of the exchanger tubes, in a first step, the heat of the hot gases is absorbed and then, in a second step, it is given off to the colder compressed air coming from the compressor and feeding the combustion chamber. A distribution system of the hot gases and of the cold air is disposed in front of the ends of the exchanger tubes, carried by a rotary drum. By means of rotation, the tubes are successively located in front of each of the distributors and thus permit their successive sweeping by the hot gases and by the hot air. The temperature of the exhaust gases extends through a temperature range of 550° to 850°, the rotating elements are subjected to significant temperature variations, which have the effect of a change in their geometrical dimension. The patent, which is mentioned below, succeeds in limiting this variation by circulating the cold air in the support components of the stationary parts and of the rotating parts of the exchanger. These supports form a part of the compressed air feed piping. The exchanger matrices are comprised of tubes which are maintained between two annular supports. The exchanger tubes are fixed to only one of their ends, the other end being freely slidable in the support. The gases are piped through the entire length of the exchanger tubes by resilient elements, which are fixed at their ends to the end supports of the rotor and which can move freely.

The measures taken for limiting the longitudinal variations of the rotor must be accomplished by a reduction of leakage; leakages occur principally at the transitions or joints of the compressed air piping of the fixed support to the exchanger tubes of the rotating support. In fact, the pressure of the air is very much greater than that of the hot gases and it tends to leak either towards the flow of hot gases or into the atmosphere. When the rotor turns, a certain quantity of compressed air is isolated in the passages and escapes in the hot gases, which comprises a loss by entrainment.

The repetition of this loss of compressed air quite seriously comprises the energy savings which can be expected from an exchanger system. French Pat. No. 1,497,700 indicates means, which permit the reduction of these losses. To accomplish this, each end of the rotor has sealing means comprised of joint plates, which are radially disposed and extend over one portion of the upper circumference to the circumferential portion occupied by the collector taking or recovering the fluid going through the heat exchanger matrices. The rotor has fixed inside and outside annular joints (with respect to the crown of the exchangers), which cooperate with similar joints on the fixed portion. These joints are formed of annular segments, which are resiliently urged in the axial direction and towards the rotor joint by springs. The sealing device prevents radial losses. The circumferential losses between the high pressure (compressed air) and low pressure (exhaust gas) components are avoided by the use of two joint plates, which are disposed at the ends of the fluid collector, radially extending from the inside annular joint to the outside annular joint, going past the ends of the collector. These plates have grooves into which T-section bars are placed. These bars, of which the middle bar of the T cooperates with the plane surfaces of the joint elements, which are disposed between the adjacent pairs of heat exchanger conduit, assure tightness. The distance separating two lines of bars is less than the size of the joint elements, which are disposed between the exchange conduits. Pipe connections connect the two joint plates in order to equalize the pressure between the low pressure (exhaust gas) and the high pressure (compressed air) conduit.

SUMMARY OF THE INVENTION

The exchangers and their sealing devices in accordance with the present invention have the same objectives as the embodiments described above. The invention furthermore proposes to provide a light weight and small dimension exchanger, these characteristics being due to a novel sealing system between the air and gas flows, as well as special features of the exchange matrices. In accordance with this invention, this rotary exchanger for gas turbine installations comprises thermal exchange matrices, disposed in accordance with at least one cylindrical ring, which turns about the axis of the turbine, means for the retention in rotation of the annular ring between two fixed housings, passages for the gaseous fluid between the housings and the exchange matrices, fixed rings, which close the ends of the housings and between which the cylindrical ring turns, means for the distribution of the fluids, a circumferential sealing device interposed between the said fixed rings and the ends of the cylindrical ring, an axial sealing device, which separates the passage of the hot and cold fluids between two cylindrical segments of the exchange matrices, is characterized in that the thermal exchange matrix is comprised of a thermal exchange material, which is included between the lateral inside and outside surfaces of the said cylindrical ring.

BRIEF DESCRIPTION OF THE DRAWINGS

The description which follows, in combination with the attached drawings, which are provided as an example, illustrates how the invention can be realized.

DESCRIPTION OF A PREFERRED EMBODIMENT

Figure 1:
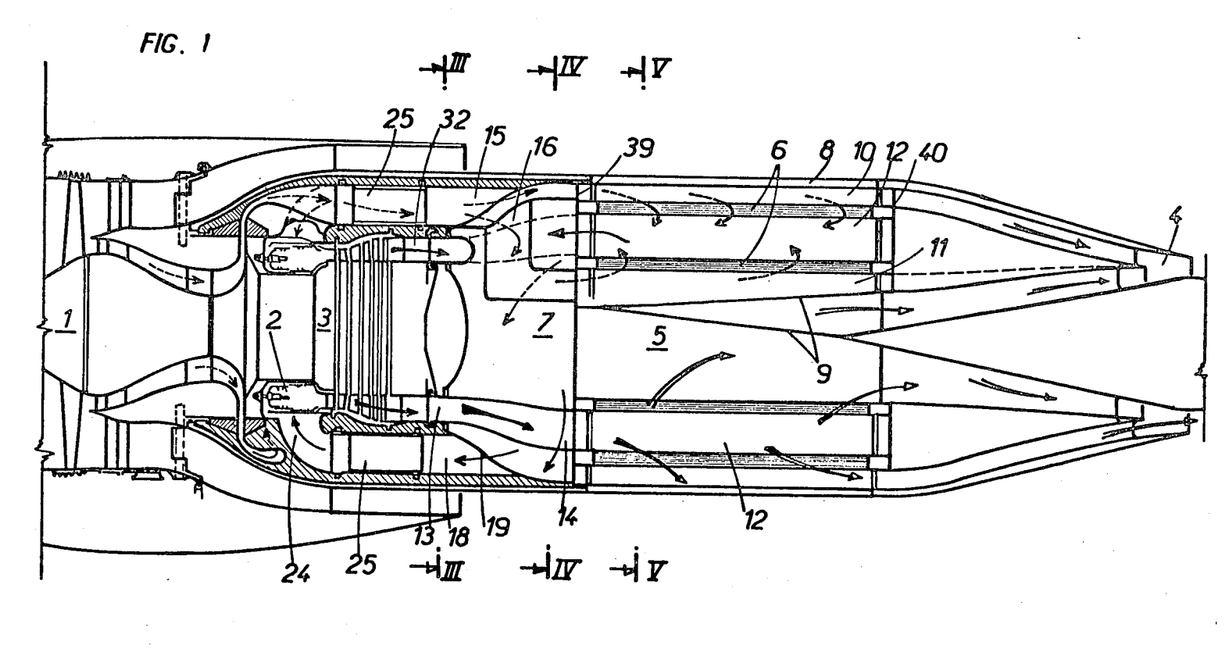
FIG. 1 is a longitudinal sectional view of a gas turbine, equipped with an exchanger in accordance with the invention.

FIG. 1 represents a schematic section of an aircraft gas turbine, which is equipped with a rotating exchanger.

The air admitted at the front passes into the compressor 1, where it is compressed before being conducted into the combustion chamber 2. The compressed air/fuel mixture is ignited and the high speed combustion gases exhaust through turbine vanes 3, causing turbine rotation. The gases of combustion are then evacuated through the jet pipe 4.

Figure 2:
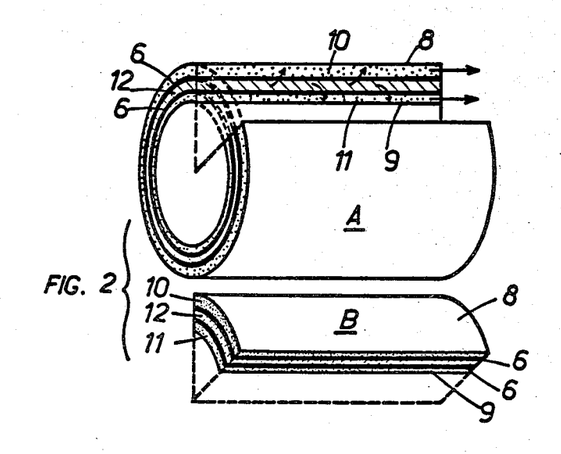
FIG. 2 is a sectional and perspective diagram of a rotary exchanger.

In order to increase the efficiency, the combustion gases, at their exit from the turbine, are directed towards a rotating heat exchanger 5, in which they are brought into contact with thermal exchange material customarily called exchange matrices 6. The gases of combustion thus leave the greatest part of their heat in the matrices before being evacuated, while the compressed cold air, which comes from the compressor heats up during the passage through the same matrices before being directed into the combustion chamber. The heat exchange is accomplished by reserving one part of the exchanger for the passage of the hot combustion gases and the other part for the passage of the compressed cold air. In accordance with one embodiment, FIG. 2 schematically shows part A, in which the gases of combustion leave their heat and part B, in which the compressed air is heated. This part B represents a small portion with respect to the totality of the cylindrical exchanger. Fluid distribution means 7, which will be detailed later, direct the distribution of the fluids in the two parts.

The exchange matrices 6 are disposed in cylindrical rings (FIG. 4) and turn concentrically with respect to each other and with respect to the axis of the turbine. In accordance with one particularity of the invention, the cylindrical rings form the exchange matrices and are composed at least in part of a thermal exchange material, which is disposed between the inside and outside surfaces of the ring. The material, which comprises the matrix, is a material, which is coherent at considerable thermal inertia. It presents a permeability for the gases in the radial direction and, preferably, zero permeability in the circumferential direction. For example, a honeycomb material, which is enclosed in sheetmetal, welded by electronic bombardment, would be suitable. The cylindrical rings turn between two tight housings 8 and 9, which delimit, with the inside and outside surfaces of the cylindrical matrices, fluid passages 10 and 11. A passage 12 also separates the exchange matrices from each other. Fixed rings 39 and 40, which define the front and rear ends of the exchanger, receive distribution means for the fluids. Circumferential sealing devices, disposed between said rings and the ends of the exchange matrices, assure the passage of the gases from the fixed portion of the exchanger to the rotating matrices. The axial tightness between the sectors receiving the hot gases and the compressed cold air is assured by an axial sealing device. These devices will be described below.

The functioning of the exchanger and of the gas circulation will now be described.

The gases of combustion (broad arrows) are directed through the intermediate conduit 13 (FIGS. 1 and 3) and of distribution ring 14 (FIG. 4) into space 12, which is located between matrices 6, corresponding to sector A of FIG. 2. The hot gases go through the exchange material, which comprises matrices 6 (double arrows) (FIG. 5), where they lose their heat and are evacuated through jet pipe 4.

Simultaneously, the compressed air is fed through conduits 15 (FIG. 3) and the distribution box 16 (FIG. 7) in front of the semi-annular openings 17 (FIG. 4) corresponding to spaces 10 and 11 of Sector B (FIG. 2). The compressed air goes through matrices 6 (discontinuous arrows) and returns through space 12 between the matrices and a distribution housing 19 through conduits 18 towards the combustion chamber 2. The heated compressed air participates in the combustion and the gases escape through turbine 3, following the path which has been described previously in order to traverse sector A. Because of the rotation of the exchanger, one portion of part A, which is heated by the gases, permanently regenerates part B, in which the compressed air, which has to be heated, circulates. FIG. 5 schematically shows delimiting passage 10 for the compressed cold air between means 20, housing 8 and matrix 6, passage 12 through which the heated compressed air passes again between means 21 and adjacent matrices 6 and passage 11 for the compressed cold air between means 22, matrix 6 and housing 9.

Figure 3:
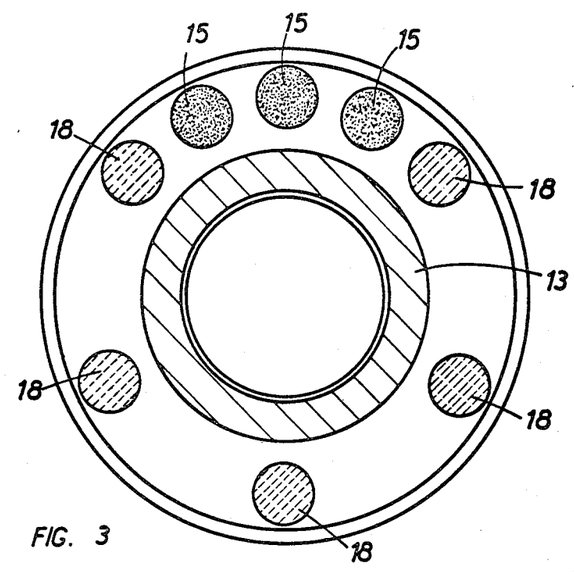
FIG. 3 is a schematic sectional view taken on line III—III of FIG. 1.
Figure 4:
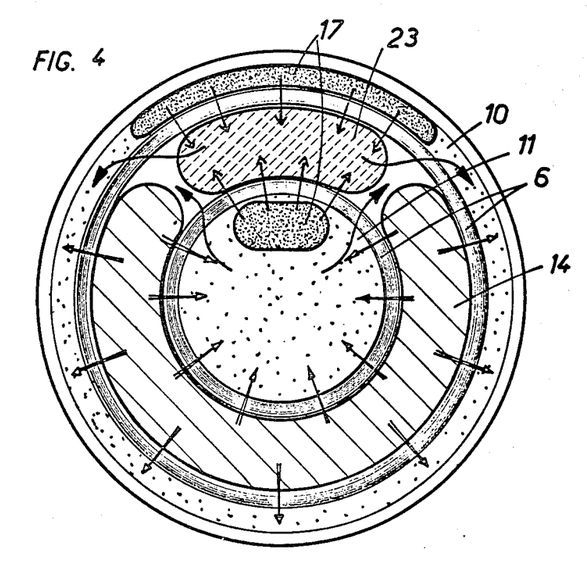
FIG. 4 is a schematic sectional view taken on line IV—IV of FIG. 1.
Figure 5:
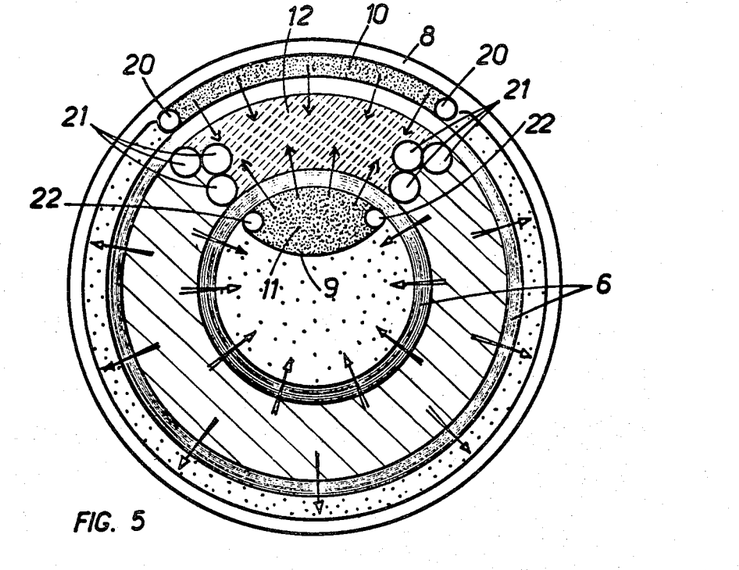
FIG. 5 is a schematic sectional view taken on line V—V of FIG. 1.
Figure 6:
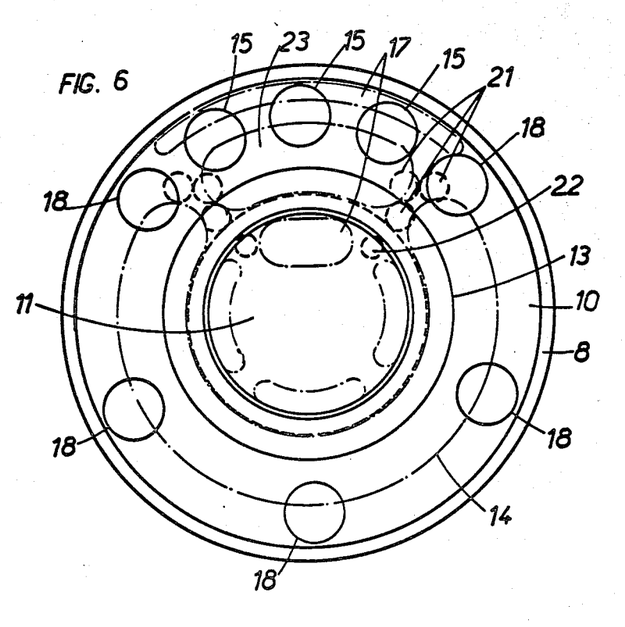
FIG. 6 is a view taken on line III—III of FIG. 1, showing the mounting of the sections of FIGS. 3, 4 and 5.
Figures 7, 8:
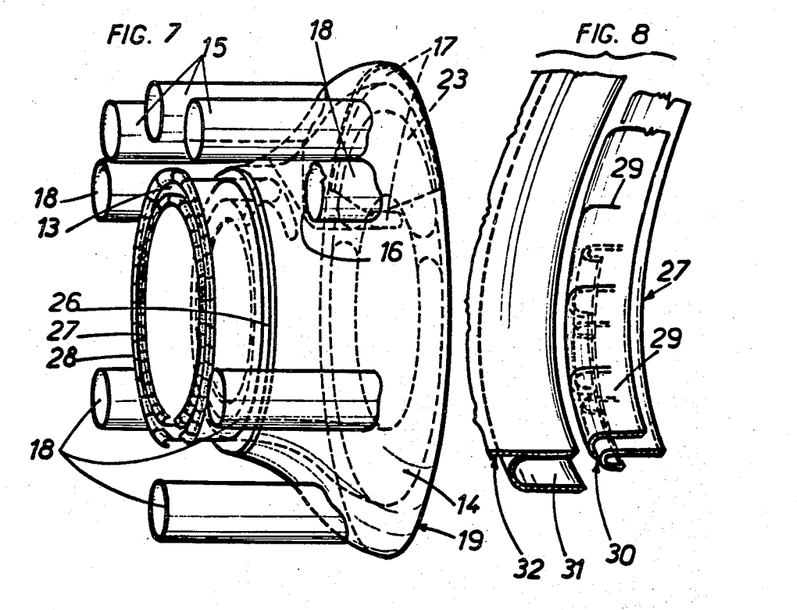
FIG. 7 is a partly cut away view, in perspective, of the fluid distribution housing.
FIG. 8 is a partial perspective view of the sealing joint, which connects the distribution housing to the conduit for the combustion gases.

FIG. 6, which is obtained by the superposition of the sections represented by FIGS. 3, 4 and 5, shows the disposition of the distribution means with respect to the rear end of the exchanger. FIG. 7 is a partly cut away perspective view of the said distribution means. Conduits 15 open into a distribution box 16, from which two semi annular pipes 17 exit. Conduit 13 ends in a semi annular distributor 14. A housing 19 heads the rear part of the exchanger and also covers the semi annular distributor 14, which are disposed, for their greatest part, inside housing 19.

In accordance with the mechanical concept of the exchanger, which is the object of this invention, it presents itself in the form of a modular assembly. The exchanger and the fluid distributors (compressed air and gases of combustion) form an entity, which is easily disassembled from the body of the reactor. As has already been indicated, the rear end of the exchanger is headed by a distribution housing 19, which includes the connecting conduits, which are easily accessible and connectible to the conduits coming from the compressor or going to the combustion chamber through sliding sleeves 25, which are in themselves known. The connection of the outlet ring of the turbine to conduit 13 for the recovery of heat from the hot combustion gases presents a peculiarity, which assures a good tightness, while offering a maximum passage for the high temperature gases. The annular-shaped conduit 13 (FIG. 7) penetrates coaxially into housing 19, which is itself coaxial with the exchanger 5 and is attached to an annular flange 26. On the outside and inside walls, which define this conduit, and at their ends, flanges 27 and 28 are attached, of which the free edges are directed towards the outside of the piping. The partially cut away view of FIG. 7 shows this arrangement. The flanges are made from two elastic bands, which are profiled in the form of a J (FIG. 8). Each band has notches 29, which radially cut a part of the profile. Two of these bands are arranged on top of each other and are welded together and to the edge of the piping in such a way that the notches on one correspond to the plain segments of the other. This arrangement results in the assurance of tightness, while maintaining the elasticity of curved part 30 of the profile. This elastic flange cooperates with a U-shaped inverse profile, which is attached to the end of the outlet ring of the turbine. Flange 28 is resiliently held against the lateral branches of the U profile 31, maintaining an accurate centering of pipings 13 and 32, while permitting expansion and assuring tightness. A similar inversely arranged U profile assures tightness with flange 27. In accordance with the embodiment of the housing illustrated in FIG. 7, the housing is pear-shaped and is truncated at the lower end, parallel and perpendicular to its axis. It goes without saying that other simpler embodiments are also suitable, for example, a parallel base truncated cone, a spherical zone or other volume capable of heading the end of the exchanger.

Figure 9:
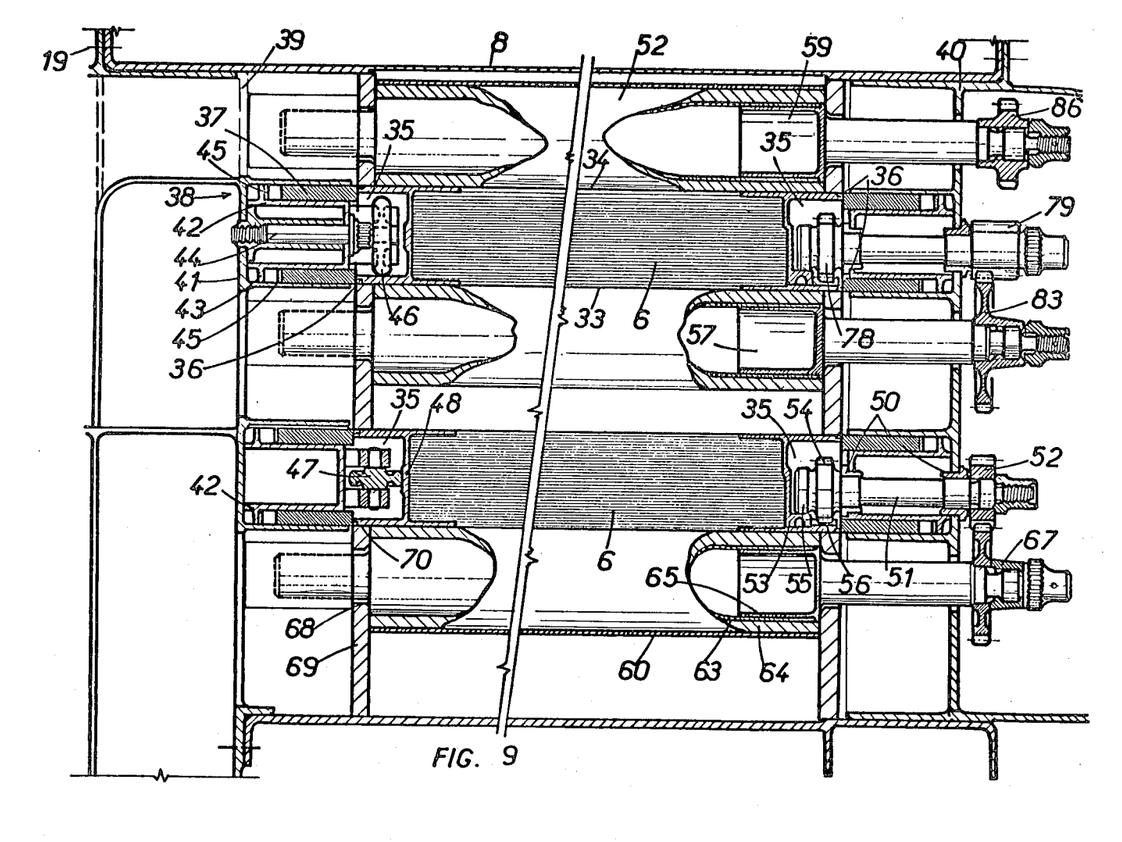
FIG. 9 is a sectional view of a part of the exchanger.

FIG. 9 shows a partial sectional view of an exchanger in accordance with the invention. The fluid distribution housing 19 is attached to housing 8 of the exchanger. The exchange matrices 6, which number two in this embodiment, form cylindrical rings, which are directly machined into the thermal exchange material, or have two concentric cylindrical walls 33 and 34, between which the thermal exchange material is disposed, of which the radial permeability is great and the circumferential permeability is practically zero. The ends of the exchange matrices form an annular chamber, which is open to the outside in the axial direction. Edges 36 of the chamber are machined in such a manner as to form a lip with a reduced surface, being supported on the cylindrical segment 37, of a heat-resistant material, having a reduced coefficient of friction and assuring a good tightness. In accordance with one embodiment, the material which is used is graphite. These cylindrical segments are placed next to each other in supports 38, for a cylindrical crown of the same average diameter as walls 33 and 34 of the exchange matrix or as the edges of the annular chambers.

Supports 38 are formed by front and rear fixed rings 39 and 40, on the faces of which annular chambers 41 are provided. U profile rings 42 with centering flanges 43 and attached to the fixed ring by means 44, are placed in these chambers. The space included between rings 42 and the lateral walls of the annular chambers 41 receives cylindrical segments 37, which assure the tightness. Elastic means 45 press the annular segments 37 against the edges of the exchange matrices. Elastic means 45 are comprised of a corrugated spring steel washer, of which at least one crown of the corrugation is supported against the back of a cylindrical segment. The cylindrical segments are pseudo-cylinders, which are deformable axially, allowing the absorption of dimensional variations due to production tolerances and due to heat expansion, while still assuring a constant axial seal of the ends of the exchange matrices. At each end, the edges of an exchange matrix thus cooperate with a deformable double cylinder of frictional material, comprised of the cylindrical segments.

The rotation and the centering of the cylindrical exchange matrices is obtained through frictional rollers 46 and 47, which are disposed at the ends of the matrices. The frictional rollers are distributed uniformly over the circumference in such a manner as to alternate one frictional roller 46, which assures radial centering, and one frictional roller 47, which assured axial centering. These frictional rollers are maintained in a frame, which is attached to the U-section ring 42. A raceway 48, which cooperates with the axial centering frictional rollers 47, is preferably provided at the base of circular chamber 35. Radially centering frictional rollers 46 cooperate with a lateral inside wall of chamber 35.

The rear end of the exchangers, and more particularly the fixed ring 40, has, as ring 39, annular chambers, in which U-profile rings are placed. The rings hold frames for restraining the centering frictional rollers and a stage 50, which cooperates with an arbor 51, which is equipped, at one of its ends, with a gear-wheel 52, which is kept in rotation by a gear train, which will be described below. The other end of arbor 51 has a gearwheel 54 and a friction roller 55. This train cooperates with a rack 56, cut or supported on one wall of annular chamber 35, which is provided at the rear end of the exchange matrix. In order to avoid frictional forces, which are too great, between the teeth of the drive, the frictional roller 55, which is in one piece with axis 51 and gearwheel 54, cooperates with a roller train 53, which is provided on the lateral wall, which also carries rack 56. Each exchange matrix comprises an identical drive assembly. The matrix assemblies cooperate with each other and with a transmission pinion in accordance with an arrangement, which will be described below.

The axial sealing between the exchange matrices, which allow a separation of parts A and B, which receive the hot combustion gases and the compressed cold air, is obtained by two assemblies, including rollers 57 and 58, arranged between two adjacent exchange matrices 61 and 62 (FIG. 10) and two rollers 59 and 60, which are located on the outer and inner sides of the matrices. Roller 59 assures tightness between the outside surface of matrix 61 and the outside housing 8, through a sealing device, which will be described below, and roller 60 between the inside surface of matrix 62 and inside housing 9 through a device similar to the above.

Figure 10:
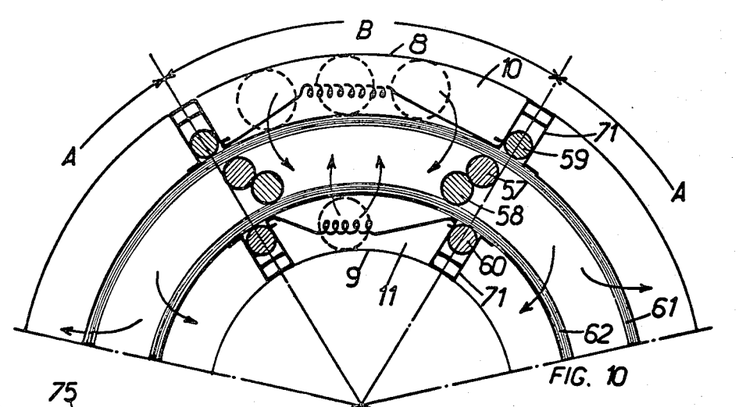
FIG. 10 is a transverse section of a portion of the exchanger, showing the axial sealing means.

In accordance with the embodiment shown in FIG. 10, there are two rollers, which assure tightness between matrices 61 and 62. The same sealing device can be designed with only one roller, tangent, with two of its radii, to the walls of the matrix, or with three or more rollers. An example with three rollers is illustrated in FIG. 5. Depending on whether an odd or even number of rollers is used, the exchange matrices must rotate in opposite directions or in the same direction.

Figure 11:
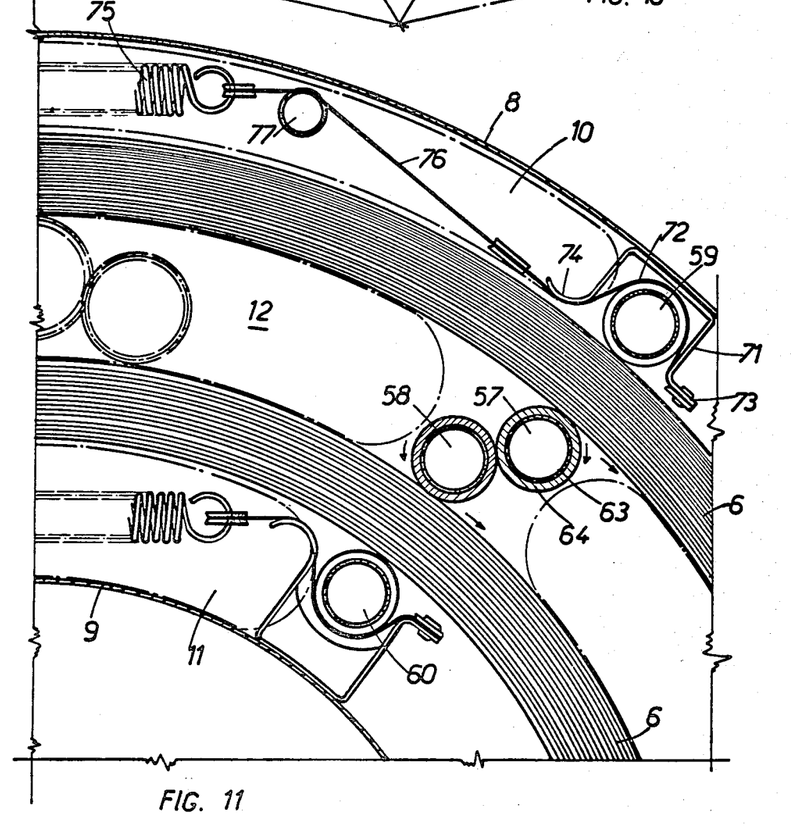
FIG. 11 is a large scale view of the sealing means shown on the right side of FIG. 10.

In accordance with the embodiment shown in FIGS. 9 to 11, the rollers are comprised, for example, of a rigid tube 63, which is covered by a relatively flexible material 64. The ends of the tube are provided with hollow cylindrical parts 65 with axles 66. The rollers are arranged in such a manner as to be tangent to one of the radii of the exchange matrices. The rollers, which are located in space 12 between matrices are tangent to these matrices and to each other. At their ends, they are held by pillow-blocks, which are in themselves known and not shown and which cooperate with their axles. The front axles, which are relatively short, serve only to support the roller in rotation, while the rear axles, extending through ring 40, are equipped with gearwheels 67, which permit their rotational drive in accordance with a process, which will be described below. In accordance with the location of the rollers, it has been foreseen that they can be displaced by a circular or radial movement or only radially. That is how, in the illustrated example, roller 57 is provided with pillow-blocks, which allow only a radial displacement, while roller 58 is provided with pillow-blocks, allowing a displacement in the radial and circular directions. It is, of course, understood that another motional function is possible between rollers 57 and 58.

Rollers 59 and 60 need only a radial movement.

The rollers exert a permanent pressure on the radii of the exchange matrices, which assures a longitudinal seal between the arcuate spaces located around the rollers. The pressure is exerted through pressure means acting on the pillow-blocks, which cooperate with the axles of the rollers.

The seal between the ends of the rollers and the front 39 and rear 40 rings is obtained by friction of the annular surface 68, formed by the end of the roller and its axle and rings of frictional material 69. These rings, which are penetrated by the axles of the rollers, are held at the rear of rings 39 and 40 by means which are not shown and which are known. The pillow-blocks, which support the axles, are themselves tight in order to avoid leakages, which would be likely to arise with circumferential and/or radial movements. Blocks 70 of rings 69 are in contact with the lateral edges 36 of the matrices and, in accordance with the embodiment, with the edges of the annular chambers, which are provided at the ends of the exchange matrices and which comprise a supplementary seal.

The longitudinal and circumferential seal between sectors A and B (FIG. 11) for spaces 10 and 11, which are located between housings 8 and 9 and the exchange matrices 6, is realized by an elastic bearing and sealing device for the rollers, which is comprised of a fixed groove 71, parallel to the roller, at its base or fixed housing 8 or 9. A flexible metal band 72, attached at one end to edge 73 of the groove, surrounds the roller over part of its circumference and is supported by a second round edge 74 of the groove. The other end of band 72 is attached to an elastic traction device, comprised, in accordance with the embodiment, by springs 75 applying a tractional force directly or through the intermediate of cables 76 and pulleys 77. In accordance with one embodiment, band 72, which assures frictional tightness on the part of the roller and by support on the rounded edge of the groove, is comprised of several bands, which are arranged side by side without spaces therebetween.

FIG. 10 shows an embodiment in which the elastic traction device is common to two of the roller sealing devices, assuring tightness between sectors A and B.

The rotational drive of the exchange matrices and of the rollers is obtained through pinions, of which the synchronization is assured by gear trains. The drive means corresponding to the example of FIG. 9 comprise two exchange matrices and two sealing rollers between the matrices and are shown at the rear of the exchanger, FIG. 12. In order to simplify the description and the figure, the sealing means has been illustrated as being disposed on one side between exchange sectors A and B and the illustration of various gear trains has been foreshortened to one plane. In order to distinguish the different rollers, the same references have been used as in FIG. 10.

Figure 12:
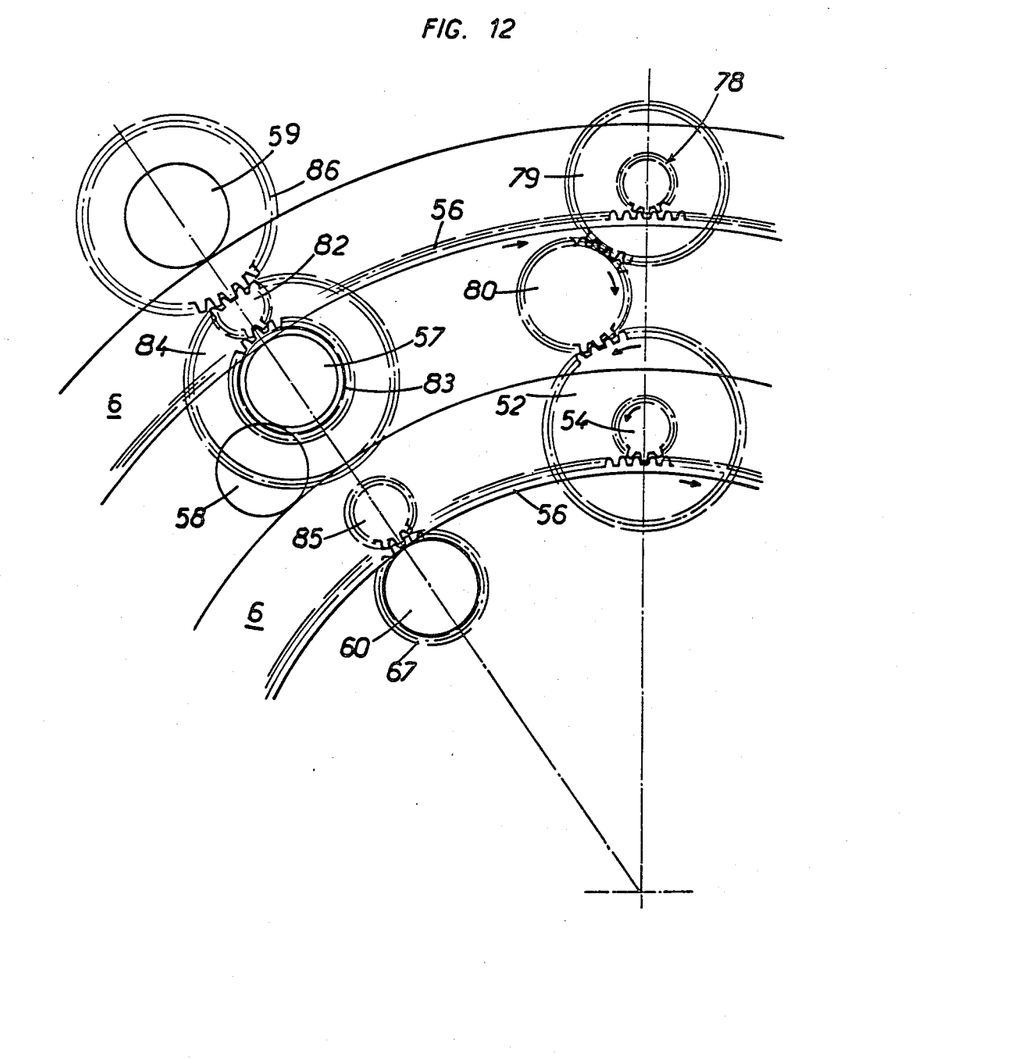
FIG. 12 is a schematic view of the retention means of the exchange matrices and the sealing means.

The exchange matrices are driven in rotation by a separate motor, a turbine or a power take-off on the turbine (not shown) through a pinion 80. This pinion engages pinions 79 and 52 at the ends of the arbors, of which the other ends have pinions 78 and 54, which cooperate with racks 56. The drive train, which is so constructed, makes the rotation of the exchange matrices in the same direction possible.

The drive of the rollers is accomplished through the intermediate of racks 56 of the exchange matrices. A pinion 82, which, in accordance with the embodiment shown, is independent of the gear train driving the matrices, engages with rack 56 and transmits the motion to roller 57 through gear train 83. A pinion 84, which cooperates with the solid pinion 86 of roller 59, is fixed on this gear train. Roller 58 is driven in rotation by the surfaces of roller 57 and the periphery of exchange matrix 6. Finally, roller 60 is driven through pinion 85, which engages with rack 56 of the exchange matrix. The ratios of the diameters of the pinions are calculated in such a manner that the linear speeds of the surface of the driven rollers and of the exchange matrices are compatible with each other.

It is understandable that it is possible, through the modification of the composition of the gear train, which keeps the exchange matrices in rotation, to attain reverse direction rotations of each of the matrices. It is then interesting to provide three rollers between the matrices in such a manner as to have a reverse directional rotation of the two outside rollers (such a case has been illustrated in FIG. 5).

In accordance with embodiments, which are not illustrated, the rollers can be directly rotationally driven by the gear train, which drives the exchange matrices.

The drive means disposed at the rear of the exchanger are enclosed in a housing, which is not shown. In a known manner, this housing is equipped with conduits for the cooled exhaust gases, combining to form jet pipe 4.

Rotary exchangers, produced in accordance with the same characteristics as those described in the above examples, may have a single ring or exchange matrix. The axial sealing devices are then reduced to two roller assemblies, such as those illustrated as 59 and 60 in FIG. 10.

These exchangers can also comprise three or more coaxial rings or matrices. The axial sealing devices would then be installed between the two roller assembly exchange matrices, such as illustrated as 57 and 58 in FIG. 10, or with three rollers as shown at 21 in FIG. 5, or even by alternating devices with two and three rollers.

We claim:

1. A rotary heat exchanger for gas turbine installations, comprising thermal exchange matrices, in the form of a cylindrical ring rotatable about the axis of the turbine, two fixed housings, rotary drive means for the said cylindrical ring between said two fixed housings, gaseous fluid passages between the housings and the exchange matrices, fixed rings forming the ends of the housings and between which the cylindrical ring turns, means for the distribution of the fluids, a circumferential sealing device interposed between said fixed rings and the ends of the cylindrical ring, an axial sealing device, separating the passage of the hot and cold fluids between two cylindrical sectors of the exchange matrices, characterized in that it comprises at least two annular exchange matrices, which are concentric with respect to the axis of the turbine, said matrices being separated by a cylindrical annular space, defining a passage for fluids, a circumferential sealing device, comprised in part by the inside and outside edges of the exchange matrices and by concentric cylinders of a frictional material, which cooperates with the axial edges of the exchange matrix, each cylinder being attached to fixed rings by support means, characterized in that the support means have annular chambers in which U-profiled rings are placed, having centering means and attached to the fixed ring, the space between the rings and the lateral walls of the annular chambers receiving the concentric cylinders of a frictional material.

2. An exchanger in accordance with claim 1, characterized in that the ends of the exchange matrices form two open annular chambers, the edges of the opening of the said chambers constituting, with the concentric double cylinder, which comprises their face, at least one part of the circumferential sealing device.

3. An exchanger in accordance with claim 2, characterized in that centering means in the radial direction and in the longitudinal direction are provided at each end of the exchange matrix, said centering means being carried by a part of the support means of the double cylinder of the circumferential sealing device and cooperating with one of the walls of the annular chambers.

4. An exchanger in accordance with claim 2, characterized in that the said annular chambers carry matrix rotating means which cooperate with the said centering means and at least one rack on the matrix cooperating with the rotary drive means.

5. An exchanger in accordance with claim 1, characterized in that the axial sealing device is comprised of at least one roller disposed between two adjacent exchange matrices, the axis of the roller being parallel to the axis of the exchange matrix, the roller being supported on the surface of at least one exchange matrix.

6. An exchanger in accordance with claim 5, characterized in that the axial sealing device is comprised of at least two rollers tangent to each other at one of their radii and each tangent at a second radius with the surface of the adjacent exchange matrix.

7. An exchanger in accordance with claim 5 or 6, characterized in that the annular surface formed by the end of one roller and an axle thereon is in sliding contact with a head of frictional material, said head being passed through by the said axle and held by a fixed ring at the end of the exchanger, said head being in sliding contact with the lateral edges of the heat exchange matrices.

8. An exchanger in accordance with claim 5, including axial sealing means between inside and outside fixed housings and the exchange matrix comprising rollers with their axes parallel to the axis of the exchange matrix, each tangent at one of its radii to the periphery of the matrix, and of an elastic tightening device for the roller.

9. An exchanger in accordance with claim 8, characterized in that the elastic tightening device for the roller is comprised of a fixed groove, with its base parallel to the fixed housing, an elastic metal band, fixed at one end on one edge of the groove, said band embracing a cylindrical sector of the roller opposite to the radius of the roller which is in contact with the exchange matrix, the other end being supported and guided by the second edge of the groove and connected to an elastic traction device.

10. An exchanger in accordance with claim 9, characterized in that the sealing device has, on the inside housing and on the outside housing, two of the said elastic tightening devices for the roller, the arrangement of the grooves being such that the elastic traction devices are common to the two devices.

11. An exchanger in accordance with claim 1, characterized in that the fluid distribution devices comprise a double heat exchanger, a fluid distribution housing for the fluid which is heated by the passage through the matrices surrounding the distribution housing of the cold fluid and the distribution housing of the hottest fluid, which serves for the heating of the matrices.

12. An exchanger in accordance with claim 11, characterized in that the distribution housing for the coldest fluid is a separate structure from the fixed housings between which the heat exchange matrices turn in order to form a modular assembly.

13. An exchanger in accordance with claim 11 or 12, characterized in that the housing is of truncated conical form, the small end of which defines an annular opening carrying sealing means corresponding to the hottest fluid distribution and the surface of the housing being pierced by tubular conduits for the coldest fluid and the fluid which is heated by the passage through the heat exchange matrices.

14. An exchanger in accordance with claim 13, characterized in that the sealing means are formed of two parts, one part being on conduits coming from the turbine and the other part being at the annular opening of the modular exchanger assembly; the part of the sealing means at the annular opening comprising J-section crowns of an elastic metallic material, each crown being partially cut in the plane of the profile in such a manner that the resulting segments be tied together by a part of the end of the longest branch, the two crowns, offset with respect to each other in such a manner that the cut sections of one be covered by the plain portions of the other, are fixed on the edges of the conduit; the part of the sealing means on the conduits, which come from the turbine, being formed of one U-section crown of such a dimension and form that the sealing means at the annular opening elastically penetrate the inside of the said crown.

\* \* \* \* \*